US012592926B2

(12) United States Patent
Madarshahian et al.

(10) Patent No.: US 12,592,926 B2
(45) Date of Patent: Mar. 31, 2026

(54) RISK ASSESSMENT FOR PERSONALLY IDENTIFIABLE INFORMATION ASSOCIATED WITH CONTROLLING INTERACTIONS BETWEEN COMPUTING SYSTEMS

(71) Applicant: EQUIFAX INC., Atlanta, GA (US)

(72) Inventors: Ramin Madarshahian, Spring, TX (US); Matthew Jones, Boise, ID (US); Rohit Gangurde, Boise, ID (US); Joshua Johnston, Boise, ID (US)

(73) Assignee: EQUIFAX INC., Atlanta, GA (US)

( * ) Notice: Subject to any disclaimer, the term of this patent is extended or adjusted under 35 U.S.C. 154(b) by 143 days.

(21) Appl. No.: 18/400,210

(22) Filed: Dec. 29, 2023

(65) Prior Publication Data

US 2025/0220019 A1 Jul. 3, 2025

(51) Int. Cl.
*H04L 9/40* (2022.01)
*H04L 67/50* (2022.01)

(52) U.S. Cl.
CPC ........ *H04L 63/102* (2013.01); *H04L 63/1416* (2013.01); *H04L 63/1425* (2013.01); *H04L 67/535* (2022.05)

(58) Field of Classification Search
CPC .............. H04L 63/102; H04L 63/1416; H04L 63/1425; H04L 67/535; H04W 12/00505; G06Q 10/0635; G06Q 20/4016; G06Q 40/025; G06Q 40/08
See application file for complete search history.

(56) References Cited

U.S. PATENT DOCUMENTS

| | | | | |
|---|---|---|---|---|
| 10,453,142 B2 * | 10/2019 | Mun | ...................... | G06Q 40/08 |
| 10,482,464 B1 * | 11/2019 | Dietrich | ............ | G06Q 20/4016 |
| 2014/0058763 A1 * | 2/2014 | Zizzamia | ............... | G06Q 10/10 |
| | | | | 705/4 |
| 2018/0160278 A1 * | 6/2018 | Patel | ...................... | H04W 4/90 |
| 2018/0211326 A1 * | 7/2018 | Bayley | .............. | G06Q 30/0269 |
| 2018/0234444 A1 * | 8/2018 | Kaplan | .............. | H04L 63/1441 |
| 2019/0005586 A1 * | 1/2019 | Lei | ........................ | G06Q 40/08 |
| 2020/0005312 A1 * | 1/2020 | Bull | ...................... | G08B 13/22 |
| 2021/0221247 A1 * | 7/2021 | Daniel | ................... | B60L 55/00 |
| 2024/0169293 A1 * | 5/2024 | Gray | ................. | G06Q 10/0635 |
| 2025/0111238 A1 * | 4/2025 | Islam | ..................... | G06N 20/00 |

* cited by examiner

*Primary Examiner* — Michael Won
(74) *Attorney, Agent, or Firm* — Kilpatrick Townsend & Stockton LLP

(57) ABSTRACT

A system can generate a risk assessment associated with an identity element used in interactions associated with a user entity. For example, the system can receive historical data related an identity element associated with a user entity, the identity element used in a set of interactions associated with the user entity. The system can generate a binomial distribution of the historical data associated with the identity element. The system can determine, based at least in part on the binomial distribution of the historical data, a risk indicator associated with the identity element. The system can control, based at least in part on the risk indicator associated with the identity element, an interaction involving a target entity and the user entity using the identity element.

20 Claims, 5 Drawing Sheets

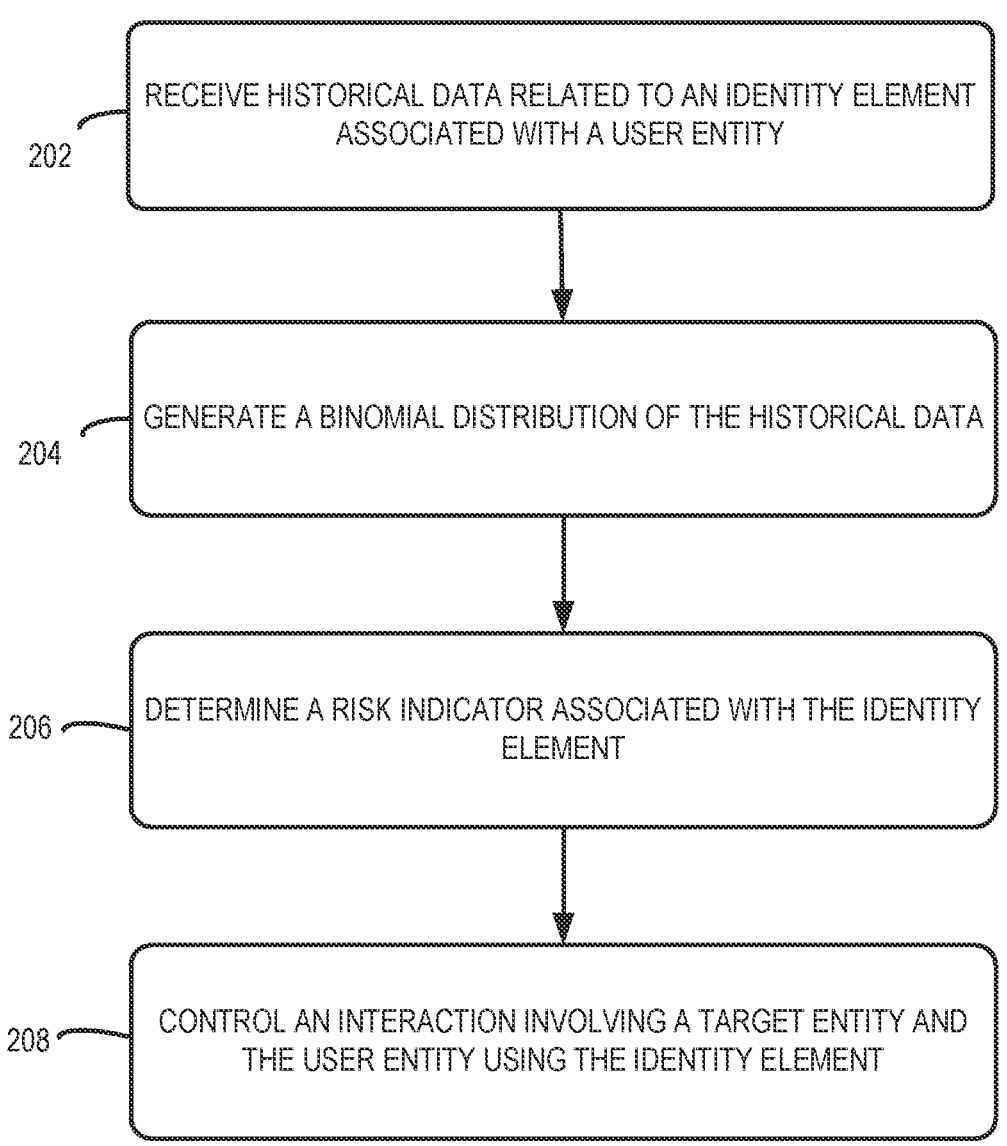
200
202 ┌ RECEIVE HISTORICAL DATA RELATED TO AN IDENTITY ELEMENT ASSOCIATED WITH A USER ENTITY
204 ┌ GENERATE A BINOMIAL DISTRIBUTION OF THE HISTORICAL DATA
206 ┌ DETERMINE A RISK INDICATOR ASSOCIATED WITH THE IDENTITY ELEMENT
208 ┌ CONTROL AN INTERACTION INVOLVING A TARGET ENTITY AND THE USER ENTITY USING THE IDENTITY ELEMENT
FIG. 2

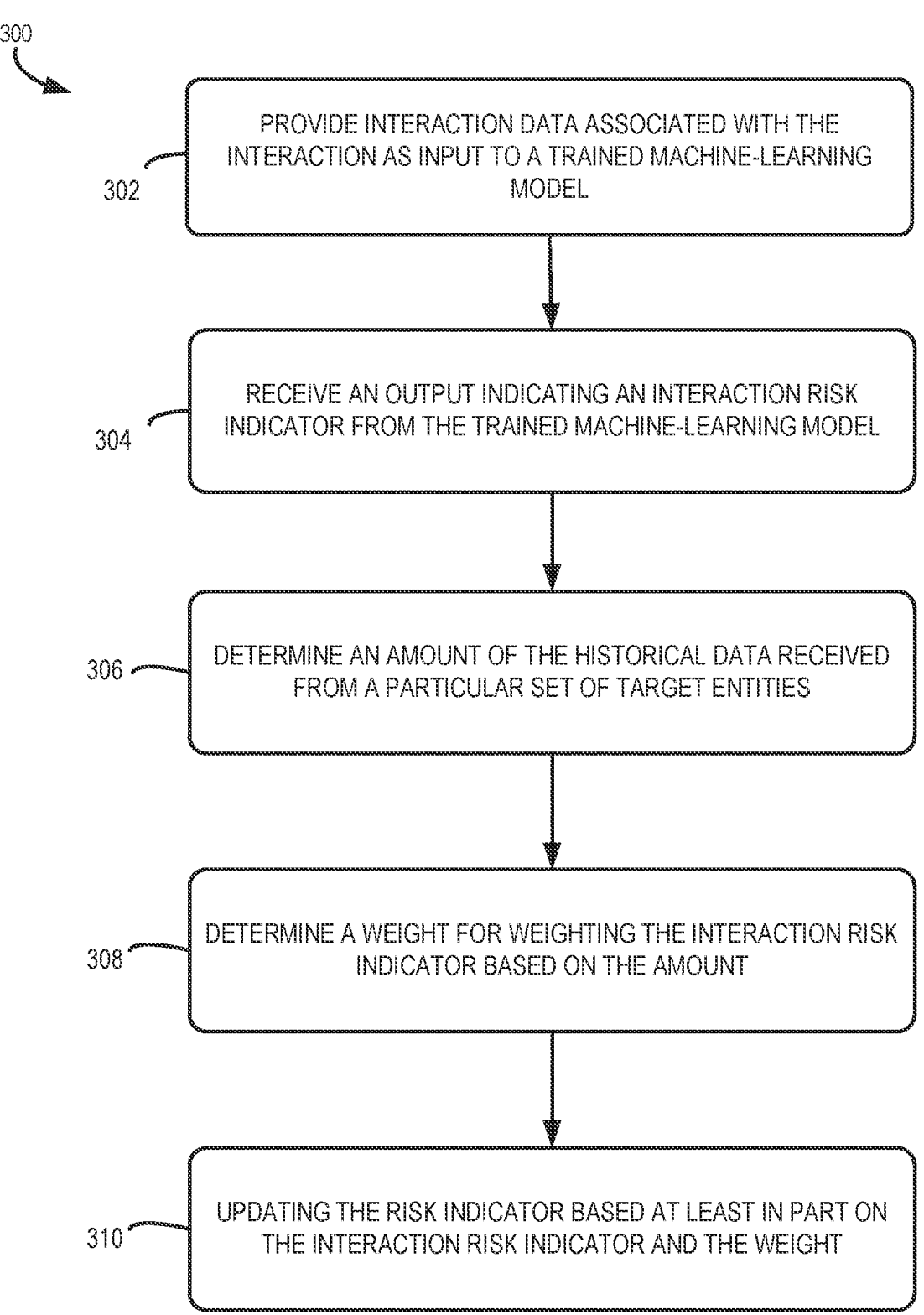

300

302   PROVIDE INTERACTION DATA ASSOCIATED WITH THE INTERACTION AS INPUT TO A TRAINED MACHINE-LEARNING MODEL

304   RECEIVE AN OUTPUT INDICATING AN INTERACTION RISK INDICATOR FROM THE TRAINED MACHINE-LEARNING MODEL

306   DETERMINE AN AMOUNT OF THE HISTORICAL DATA RECEIVED FROM A PARTICULAR SET OF TARGET ENTITIES

308   DETERMINE A WEIGHT FOR WEIGHTING THE INTERACTION RISK INDICATOR BASED ON THE AMOUNT

310   UPDATING THE RISK INDICATOR BASED AT LEAST IN PART ON THE INTERACTION RISK INDICATOR AND THE WEIGHT

FIG. 3

RISK ASSESSMENT FOR PERSONALLY IDENTIFIABLE INFORMATION ASSOCIATED WITH CONTROLLING INTERACTIONS BETWEEN COMPUTING SYSTEMS

TECHNICAL FIELD

The present disclosure relates generally to controlling interactions between computing systems. More specifically, but not by way of limitation, this disclosure relates to risk assessment for personally identifiable information associated with controlling interactions between computing systems.

BACKGROUND

Various interactions are performed frequently through an interactive computing environment such as a website, a user interface, etc. The interactions may involve transferring resources for or otherwise based on content. The content may include computing resources or other products or services desired by an entity that may transfer the resources. Determining whether entities involved in the interactions or other potential interactions are legitimate can be difficult. Further, failing to determine whether the identities are associated with the interactions are legitimate can allow malicious interactions to proceed.

SUMMARY

Various aspects of the present disclosure provide systems and methods for controlling interactions between computing systems based on risk assessment for personally identifiable information. The system can include a processor and a non-transitory computer-readable medium that can include instructions that are executable by the processor for causing the processor to perform various operations. The system can receive historical data related an identity element associated with a user entity, the identity element used in a set of interactions associated with the user entity. The system can generate a binomial distribution of the historical data. The system can determine, based at least in part on the binomial distribution of the historical data, a risk indicator associated with the identity element. The system can control, based at least in part on the risk indicator associated with the identity element, an interaction involving a target entity and the user entity using the identity element.

In other aspects, a method can be used to control interactions between computing systems based on risk assessment for personally identifiable information. The method can include receiving, by a processor, historical data related an identity element associated with a user entity, the identity element used in a set of interactions associated with the user entity. The method can include generating, by the processor, a binomial distribution of the historical data associated with the identity element. The method can include determining, by the processor and based at least in part on the binomial distribution of the historical data, a risk indicator associated with the identity element. The method can include controlling, by the processor and based at least in part on the risk indicator associated with the identity element, an interaction involving a target entity and the user entity using the identity element.

In other aspects, a non-transitory computer-readable medium can include instructions that are executable by a processor for causing the processor to perform various operations. The operations can include receiving historical data related an identity element associated with a user entity, the identity element used in a set of interactions associated with the user entity. The operations can include generating a binomial distribution of the historical data associated with the identity element. The operations can include determining, based at least in part on the binomial distribution of the historical data, a risk indicator associated with the identity element. The operations can include controlling, based at least in part on the risk indicator associated with the identity element, an interaction involving a target entity and the user entity using the identity element.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

FIG. 2 is a flow chart depicting an example of a process for generating a risk assessment associated with an identity element associated with an interaction according to some aspects of the present disclosure.

FIG. 3 is a flow chart depicting an example of a process for generating a risk assessment associated with an identity element using machine learning according to some aspects of the present disclosure.

DETAILED DESCRIPTION OF THE INVENTION

Figure 1:
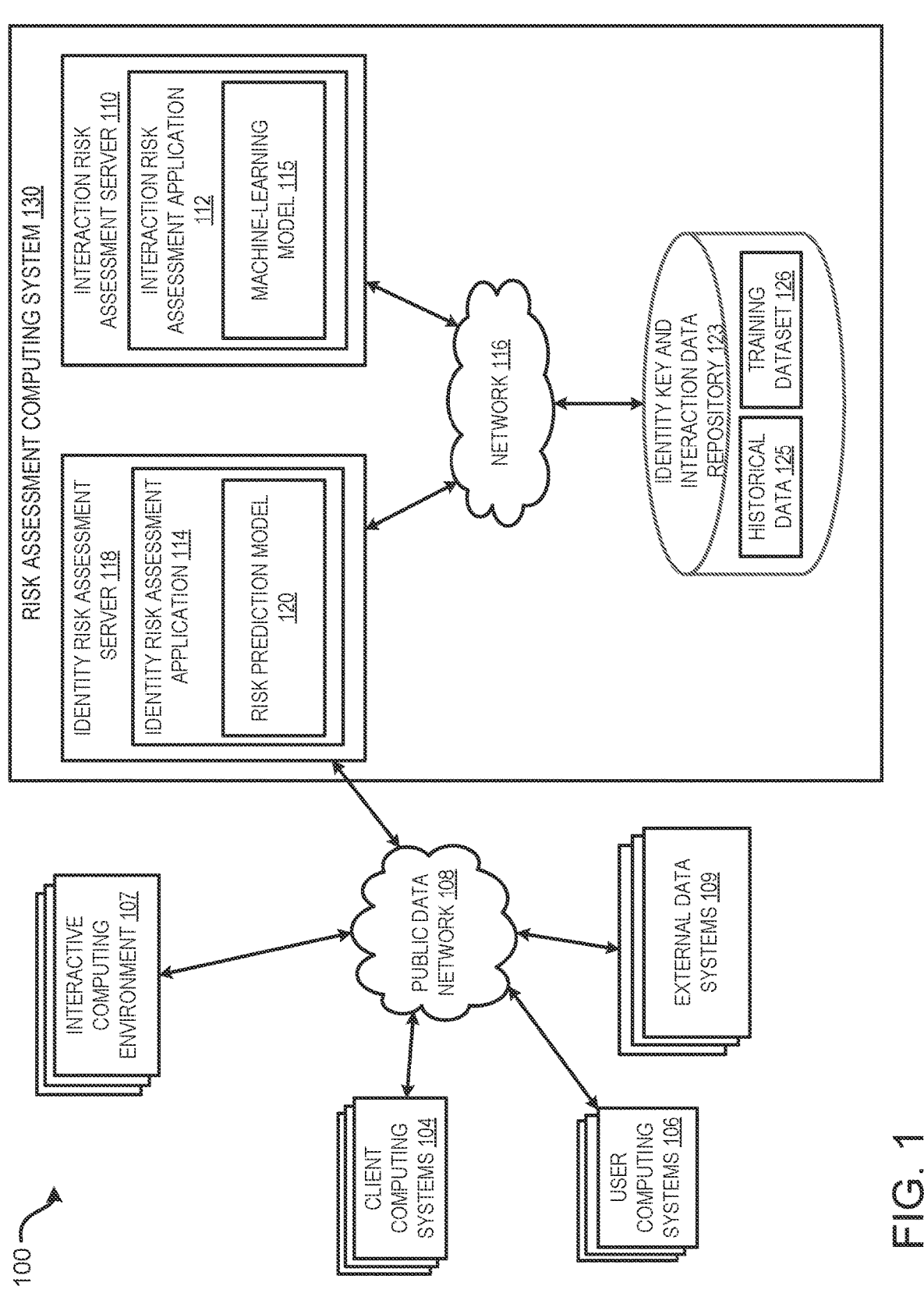
FIG. 1 is a block diagram depicting an example of an operating environment in which a risk assessment computing system can be utilized to provide a risk assessment associated with an identity element associated with an interaction according to some aspects of the present disclosure.

Identifying a manipulated identity or malicious activity can improve the security of an interactive computing environment, can improve the security of an interaction, and the like. For example, requiring personally identifiable information (also referred to herein as identity elements) prior to initiating an interaction can provide security for sensitive data associated with the interaction. But conventional techniques may not involve analyzing fraud occurrences for individual identity elements across multiple interactions. Instead, conventional techniques may focus on predicting fraudulent or malicious activity at an interaction level, rather than at an identity element level.

Certain aspects described herein for performing risk assessments on personally identifiable information can address one or more of the foregoing issues. Generating a risk indicator (e.g., a score indicating a degree of fraud risk associated with allowing an interaction to proceed) associated with individual identity elements by analyzing a binomial distribution of historical identity element data can provide a more comprehensive and granular approach to risk assessment compared to conventional techniques. The binomial distribution can be a discrete probability distribution of the number of successes or failures (e.g., presence or absence of detected fraud) in interactions using a particular identity element. This can improve an entity's ability to prevent fraudulent activities and enhance security of online interactions. Unlike conventional techniques involving hard cutoffs, techniques described herein may not involve requiring implementing hard rules on the number of occurred frauds or conditional scenarios.

Because the risk assessments generated herein involve identity elements, rather than interactions as a whole, preventative measures may also be taken. For example, an identity element with a relatively high risk indicator can be preemptively flagged for manual review, automatic refusal, or other risk mitigation measures ahead of receiving a request for an interaction using that identity element. In this way, preemptive measures can be taken to mitigate potential security threats before escalation. Further, techniques described herein can efficiently handle large-scale datasets without compromising computing performance, particularly in comparison to conventional techniques involving machine learning. Entities can therefore handle high volumes of interactions in real time, empowering swift and accurate risk assessments even during peak periods.

In some examples, a risk assessment computing system can receive historical data associated with interactions between a user entity initiating the interactions and a target entity. The interactions can include personally identifiable information, also referred to herein as identity elements, that provides identity information about the user entity. Examples of identity elements can include a name, an email address, a phone number, a location (e.g., a physical address), a device identifier, a payment token, a Social Security number, or the like. One or more interactions represented in the historical data can involve fraud events that involve a manipulated identity, fraudulent activity, and the like. A manipulated identity may include an identity (e.g., an identity element) provided by the user entity that is not accurate, that is artificially altered from an original state, that is a deviation from an expected identity of the user identity, and the like. Additionally or alternatively, a manipulated identity may be an indicator that any user entity or interaction associated therewith may involve malicious or fraudulent activity.

Examples of fraud events can include a chargeback (e.g., a completed interaction took place and was disputed; a resource transferred by the user entity was returned to the user entity), a decline by rule (e.g., the interaction was declined due to predefined policies set in place by the target entity), a decline by agent (e.g., the interaction was declined after manual review by a human entity), a refund (e.g., a completed interaction took place but was disputed; the resources exchanged in the interaction were returned to the user entity and/or the target entity), or a decline by authorization (e.g., the interaction declined due to not being authenticated).

A particular user entity may use different identity elements and different numbers of identity elements in various interactions. For example, some interactions may utilize only a phone number, while other interactions may utilize a name, a device identifier, an email address, and more. Therefore, each identity element used by the user entity in interactions may have a different number of attempted interactions and associated fraud events. The historical data can include a history of interaction attempts for each identity element for a user entity, along with the number and type of fraud event associated with each identity element. By treating each interaction as a success/failure fraud event, the risk assessment computing system can generate a binomial distribution of the historical data for a particular identity element. The binomial distribution can be used to generate a risk indicator associated with the particular identity element.

In interactions with no history of observed fraud, the associated risk can be deemed as zero. In some examples, it may be beneficial to apply techniques described herein to historical data in which at least one fraud event was detected. To align this approach with the binomial distribution, both the number of fraud events and the total number of interactions can be subtracted by one. This can ensure that, within the historical data obtained under the condition of at least one fraud event, there can be zero detected fraud out of n−1 interactions, where n is the total number of interactions in the historical data. This can increase resolution for accurate predictions of risk indicators. In other examples, the binomial distribution can be generated from historical data that includes any number of fraud events for a type of identity element, including zero fraud events.

In some examples, the risk assessment computing system can generate a risk indicator for each type of fraud event associated with a particular identity element based on the binomial distribution. Then, each of the risk indicators for fraud events can be combined into an overall risk indicator associated with the identity element. Individual fraud event risk indicators can be weighted in the combination function that generates the overall risk indicator. For example, decline by authorization may be a more common fraud event than other types of fraud events, and can result more frequently from non-fraudulent actions. So, a weight for the decline by authorization fraud event risk indicator can be lower than weights for risk indicators generated for other types of fraud events. The overall risk indicator can be used to control an interaction between the user entity and a target entity. For example, the overall risk indicator can be included in a responsive message to a query for evaluating an interaction using the identity element in which the responsive message can be used to allow, challenge, or deny the request. For example, if the overall risk indicator is above a predefined threshold, a subsequent interaction using the identity element may be automatically denied or flagged for manual review. In some examples, risk indicators for a certain type of fraud event associated with the identity element may be used in the same manner to control an interaction that uses the identity element.

In some examples, the historical data associated with the identity element may be received from multiple target entities. Not all target entities providing historical data may provide detailed (or any) fraud information. For example, a first target entity may have comprehensive fraud event detection measures in place, while a second target entity may report little or no fraud events. This may not mean that the user entity is not performing fraudulent or malicious activity with the second target entity. To sufficiently consider the source of the historical data in risk assessment, the risk assessment computing system may additionally utilize a machine learning model that is trained to generate interaction risk indicators (e.g., a score indicating the risk level associated with a particular interaction as a whole) based on interaction data for a particular interaction.

For example, the risk assessment computing system may determine if there are a sufficient number of samples in the historical data associated with the identity element that were received from "approved" target entities, such as by accessing a stored list. The approved target entities may be entities that are known to report detailed fraud information. If the number or proportion of samples in the historical data received from the approved target entities does not exceed a predefined threshold, the risk assessment computing system can update the overall risk indicator associated with the identity element using the output for the machine learning model. A mean interaction risk indicator can be determined from the interaction risk indicator generated for each interaction indicated in the historical data. The overall risk indicator can be updated using the mean interaction risk indicator. This may be a sliding combination, as a weight for the mean interaction risk indicator can be higher if there are relatively fewer samples in the historical data received from approved target entities, or lower if there are relatively higher samples in the historical data received from approved target entities. This can further improve the accuracy of the overall risk indicator associated with the identity element.

Certain aspects described herein, which can include generating one or more risk indicators associated with identity elements and providing a responsive message using the risk indicator, can improve at least the technical fields of controlling interactions between computing environments, access control for a computing environment, or a combination thereof. For instance, by generating and transmitting the responsive message, the risk assessment computing system can cause an interaction to be controlled more accurately. The risk indicator may be used to better predict whether the request initiating the interaction is legitimate, and using the risk indicator may yield fewer malicious interactions than if the responsive message is not used. And, transmitting the responsive message with the risk indicator facilitates a practical application of the binomial distribution techniques described herein by facilitating control of a real-world process such as an interaction between computing environments. Additionally or alternatively, by using the risk indicator associated with an identity element, a risk assessment computing system may provide legitimate access to or prevent illegitimate access to an interactive computing environment using fewer computing resources compared to other risk assessment systems or techniques. For example, the risk indicator can be determined using less data about the receiving entity than other techniques, which may rely on identifying data such as fingerprints, facial scans, and the like. By using less data, (i) memory usage, (ii) processing time, (iii) network bandwidth usage, (iv) response time, and the like for controlling access to the interactive computing environment is reduced, and functioning of a computing device is improved. Accordingly, the risk assessment computing system improves the access control for computing environments by reducing memory usage, processing time, network bandwidth consumption, response time, and the like with respect to controlling access to the interactive computing environment using at least the binomial distribution techniques described herein.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

Operating Environment Example for Generating a Risk Assessment Associated with an Identity Element Referring now to the drawings, FIG. 1 is a block diagram depicting an example of an operating environment in which a risk assessment computing system can be utilized to provide a risk assessment associated with an identity element associated with an interaction according to some aspects of the present disclosure. FIG. 1 depicts examples of hardware components of a risk assessment computing system 130, according to some aspects. The risk assessment computing system 130 can be a specialized computing system that may be used for processing large amounts of data using a large number of computer processing cycles. In other examples, the risk assessment computing system 130 may be or include a general-purpose computing system. The risk assessment computing system 130 can include an identity risk assessment server 118 for performing a risk assessment (e.g., predicting future risk of the entity, predicting likelihoods of success for contact, etc.) with respect to an identity element associated with a user entity, such as a target individual or a user computing device, using risk assessment data, which may include historical data 125 such as identity information, fraud events associated with the identity information, and the like.

The identity risk assessment server 118 and the interaction risk assessment server 110 can include one or more processing devices that can execute program code, such as an identity risk assessment application 114, a risk prediction model 120, an interaction risk assessment application 112, a machine-learning model 121, and the like. The program code can be stored on a non-transitory computer-readable medium or other suitable medium. The identity risk assessment server 118 can perform risk assessment validation operations or access control operations for validating or otherwise authenticating, for example using other suitable modules, models, components, etc. of the identity risk assessment server 118 or the interaction risk assessment server 110, receive historical data 125 such as interaction data and identity element data and the like received from the user computing systems 106, client computing systems 104, external data systems 109, one or more data repositories, or any suitable combination thereof. In some aspects, the identity risk assessment application 114 can authenticate or deny a request for an interaction by utilizing the historical data 125.

Historical data 125 may be received by the external data systems 109, though the historical data 125 may be received from other suitable sources. The historical data 125 can be determined or stored in one or more network-attached storage units on which various repositories, databases, or other structures are stored. An example of these data structures can include the identity element and interaction data repository 123. Additionally or alternatively, a training dataset 126 can be stored in the identity element and interaction data repository 123. In some examples, the training dataset 126 can be used to train the machine-learning model 115. The machine-learning model 115 can be trained to generate interaction risk indicators associated with an interaction based on real-time data and the historical data 125.

Network-attached storage units may store a variety of different types of data organized in a variety of different ways and from a variety of different sources. For example, the network-attached storage unit may include storage other than primary storage located within the identity risk assessment server 118 or the interaction risk assessment server 110 that is directly accessible by processors located therein. In some aspects, the network-attached storage unit may include secondary, tertiary, or auxiliary storage, such as large hard drives, servers, and virtual memory, among other types of suitable storage. Storage devices may include portable or non-portable storage devices, optical storage devices, and various other mediums capable of storing and containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as a compact disk or digital versatile disk, flash memory, memory devices, or other suitable media.

Furthermore, the risk assessment computing system 130 can communicate with various other computing systems. The other computing systems can include user computing systems 106, such as smartphones, personal computers, etc., client computing systems 104, and other suitable computing systems. For example, user computing systems 106 may transmit, such as in response to receiving input from the target entity, requests for accessing the interactive computing environment 107 to the client computing systems 104. In response, the client computing systems 104 can send authentication queries to the identity risk assessment server 118, and the identity risk assessment server 118 can receive historical data 125 involving an identity element used in the request, generate an identity risk indicator associated with the identity element, receive an interaction risk indicator associated with the request from the interaction risk assessment application 112 to update the identity risk indicator associated with the identity element, or a combination thereof. While FIG. 1 illustrates that the risk assessment computing system 130 and the client computing systems 104 are separate systems, the risk assessment computing system 130 and the client computing systems 104 can be one system. For example, the risk assessment computing system 130 can be a part of the client computing systems 104, or vice versa.

As illustrated in FIG. 1, the risk assessment computing system 130 may interact with the client computing systems 104, the user computing systems 106, or a combination thereof via one or more public data networks 108 to facilitate interactions between users of the user computing systems 106 and the interactive computing environment 107. For example, the risk assessment computing system 130 can facilitate the client computing systems 104 providing a user interface to the user computing system 106 for receiving various data from the user. The risk assessment computing system 130 can transmit validated risk assessment data, for example similarity-preserving hashes, comparisons or scores determined therefrom, etc., to the client computing systems 104 for providing, challenging, or rejecting, etc. access of the user entity to the interactive computing environment 107. In some examples, the risk assessment computing system 130 can additionally communicate with third-party systems, such as external data systems 109 to receive risk assessment data, entity data, interaction data, and the like, through the public data network 108. In some examples, the third-party systems can provide real-time (e.g., streamed) data about the user entity, historical data about the user entity, etc. to the risk assessment computing system 130.

Each client computing system 104 may include one or more devices such as individual servers or groups of servers operating in a distributed manner. A client computing system 104 can include any computing device or group of computing devices operated by a seller, lender, or other suitable entity that can provide products or services. The client computing system 104 can include one or more server devices. The one or more server devices can include or can otherwise access one or more non-transitory computer-readable media.

The client computing system 104 can further include one or more processing devices that can be capable of providing an interactive computing environment 107, such as a user interface, etc., that can perform various operations. The interactive computing environment 107 can include executable instructions stored in one or more non-transitory computer-readable media. The instructions providing the interactive computing environment can configure one or more processing devices to perform the various operations. In some aspects, the executable instructions for the interactive computing environment can include instructions that provide one or more graphical interfaces. The graphical interfaces can be used by a user computing system 106 to access various functions of the interactive computing environment 107. For instance, the interactive computing environment 107 may transmit data to and receive data, such as via the graphical interface, from a user computing system 106 to shift between different states of the interactive computing environment 107, where the different states allow one or more electronic interactions between the user computing system 106 and the client computing system 104 to be performed.

In some examples, the client computing system 104 may include other computing resources associated therewith (e.g., not shown in FIG. 1), such as server computers hosting and managing virtual machine instances for providing cloud computing services, server computers hosting and managing online storage resources for users, server computers for providing database services, and others. The interaction between the user computing system 106, the client computing system 104, and the risk assessment computing system 130, or any suitable sub-combination thereof may be performed through graphical user interfaces, such as the user interface, presented by the risk assessment computing system 130, the client computing system 104, other suitable computing systems of the computing environment 100, or any suitable combination thereof. The graphical user interfaces can be presented to the user computing system 106. Application programming interface (API) calls, web service calls, or other suitable techniques can be used to facilitate interaction between any suitable combination or sub-combination of the client computing system 104, the user computing system 106, and the risk assessment computing system 130.

A user computing system 106 can include any computing device or other communication device that can be operated by a user or entity, such as the user entity, which may include a consumer or a customer. The user computing system 106 can include one or more computing devices such as laptops, smartphones, and other personal computing devices. A user computing system 106 can include executable instructions stored in one or more non-transitory computer-readable media. The user computing system 106 can additionally include one or more processing devices configured to execute program code to perform various operations. In various examples, the user computing system 106 can allow a user to access certain online services or other suitable products, services, or computing resources from a target entity, such as the client computing system 104, to engage in mobile commerce with the client computing system 104, to obtain controlled access to electronic content, such as the interactive computing environment 107, hosted by the client computing system 104, etc.

In some examples, the user entity can use the user computing system 106 to engage in an electronic interaction with the client computing system 104 via the interactive computing environment 107. The risk assessment computing system 130 can receive a request, for example from the user computing system 106, to access the interactive computing environment 107 and can use data, such as real-time data, the historical data 125, or any other suitable data or signals determined therefrom, to determine whether to provide access, to challenge the request, to deny the request, etc. An electronic interaction between the user computing system 106 and the client computing system 104 can include, for example, the user computing system 106 being used to request a financial loan or other suitable services or products from the client computing system 104, and so on. An electronic interaction between the user computing system 106 and the client computing system 104 can also include, for example, one or more queries for a set of sensitive or otherwise controlled data, accessing online financial services provided via the interactive computing environment 107, submitting an online credit card application or other digital application to the client computing system 104 via the interactive computing environment 107, operating an electronic tool within the interactive computing environment 107 (e.g., a content-modification feature, an application-processing feature, etc.), etc.

In some aspects, an interactive computing environment 107 implemented through the client computing system 104 can be used to provide access to various online functions. As a simplified example, a user interface or other interactive computing environment 107 provided by the client computing system 104 can include electronic functions for requesting computing resources, online storage resources, network resources, database resources, or other types of resources. In another example, a website or other interactive computing environment 107 provided by the client computing system 104 can include electronic functions for obtaining one or more financial services, such as an asset report, management tools, credit card application and transaction management workflows, electronic fund transfers, etc.

A user computing system 106 can be used to request access to the interactive computing environment 107 provided by the client computing system 104. The client computing system 104 can submit a request, such as in response to a request made by the user computing system 106 to access the interactive computing environment 107, for risk assessment to the risk assessment computing system 130 and can selectively grant or deny access to various electronic functions based on risk assessment performed by the risk assessment computing system 130. Based on the request, or continuously or substantially contemporaneously, the risk assessment computing system 130 can determine one or more risk signals or risk indicators for data associated with an identity element provided by a user entity, which may submit or may have submitted the request via the user computing system 106. Based on a risk indicator determined from risk prediction model 120, the risk assessment computing system 130, the client computing system 104, or a combination thereof can determine whether to grant the access request of the user computing system 106 to certain features of the interactive computing environment 107. The risk assessment computing system 130, the client computing system 104, or a combination thereof can use the risk indicator for other suitable purposes such as identifying a manipulated identity, controlling a real-world interaction, and the like.

In a simplified example, the system illustrated in FIG. 1 can configure the identity risk assessment server 118 to be used for controlling access to the interactive computing environment 107. The identity risk assessment server 118 can receive historical data 125 about an identity element used by a user entity that submitted a request to access the interactive computing environment 107. The historical data 125 may, for example, be based on the information (e.g., information collected by the client computing system 104 via a user interface provided to the user computing system 106) provided by the client computing system 104 or received via other suitable computing systems. The identity risk assessment server 118 can receive the historical data 125 indicating a fraud event history for interactions that used the identity element. In some examples, the historical data 125 may include or may be filtered to only include interactions in which at least one fraud event was detected for the identity element. The identity risk assessment server 118 can determine a risk indicator associated with the identity element by fitting the historical data 125 to a binomial distribution and weighting different types of fraud events in the historical data 125 according to predefined weights. In some examples where the historical data includes at least one fraud event, the historical data or the binomial distribution can be shifted by subtracting one from both the number of fraud events and the total number of interactions. The identity risk assessment server 118 can transmit the risk indicator, or any inference derived therefrom, to the client computing system 104 for use in controlling access to the interactive computing environment 107.

The risk indicator associated with the identity element, or any suitable score or comparison determined therefrom, can be utilized, for example by the risk assessment computing system 130, the client computing system 104, etc., to determine whether the risk associated with the user entity accessing a good or a service provided by the client computing system 104 using the identity element exceeds a threshold, thereby granting, challenging, or denying access by the user entity to the interactive computing environment 107. For example, if the risk assessment computing system 130 determines that the risk indicator indicates that risk associated with the identity element is lower than a threshold value, then the client computing system 104 associated with the service provider can generate or otherwise provide access permission to the user computing system 106 that requested the access using the identity element. The access permission can include, for example, cryptographic keys used to generate valid access credentials or decryption keys used to decrypt access credentials. The client computing system 104 can also allocate resources to the user entity and provide a dedicated web address for the allocated resources to the user computing system 106, for example, by adding the user computing system 106 in the access permission. With the obtained access credentials or the dedicated web address, the user computing system 106 can establish a secure network connection to the interactive computing environment 107 hosted by the client computing system 104 and access the resources via invoking API calls, web service calls, HTTP requests, other suitable mechanisms or techniques, etc.

In some examples, the risk assessment computing system 130 may determine whether to grant, challenge, or deny the access request made by the user computing system 106 for accessing the interactive computing environment 107. For example, based on the risk indicator associated with the identity element or other inferences, the risk assessment computing system 130 can determine that the target entity is a legitimate entity that made the access request and may authenticate the request. In other examples, the risk assessment computing system 130 can challenge or deny the access attempt if the risk assessment computing system 130 determines that the target entity may not be a legitimate entity.

In some examples, the risk indicator used to determine access to the interactive computing environment 107 may be determined at least in part based on output from the machine-learning model 115. The machine-learning model 115 may be a random forest model that is trained using the training dataset 126 to generate an interaction risk indicator (e.g., a score that predicts an overall risk that an incoming interaction is fraudulent or malicious). The identity risk assessment server 118 can update the risk indicator associated with the identity element based on the interaction risk indicator. For example, the identity risk assessment server 118 may determine a proportion of the historical data 125 that was received from approved target entities (e.g., the client computing systems 104 or external data systems 109). The risk indicator can be updated to include the interaction risk indicator based on the proportion of historical data 125 received from approved target entities.

Each communication within the computing environment 100 may occur over one or more data networks, such as a public data network 108, a network 116 such as a private data network, or some combination thereof. A data network may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or a combination of wireless interfaces. A wired network may include a wired interface. The wired or wireless networks may be implemented using routers, access points, bridges, gateways, or the like, to connect devices in the data network.

The number of devices illustrated in FIG. 1 is provided for illustrative purposes. Different numbers of devices may be used. For example, while certain devices or systems are shown as single devices in FIG. 1, multiple devices may instead be used to implement these devices or systems. Similarly, devices or systems that are shown as separate may be instead implemented in a signal device or system.
Techniques for Generating a Risk Assessment Associated with an Identity Element FIG. 2 is a flow chart illustrating an example of a process 200 for generating a risk assessment associated with an identity element associated with an interaction according to some aspects of the present disclosure. In some examples, the operations of the process 200, or any subset thereof, may be performed by the risk assessment computing system 130 via the identity risk assessment server 118 or the interaction risk assessment server 110, but other suitable systems, devices, or subsets or combinations thereof may perform one or more operations described with respect to the process 200. For illustrative purposes, the process 200 is described with reference to certain examples depicted in the figures. Other implementations, however, are possible.

At block 202, the process 200 involves receiving historical data 125 related to an identity element associated with a user entity. The identity element may have been used in a set of interactions associated with the user entity. For example, the user entity may have attempted to perform the set of interactions with one or more target entities, and each of the interactions may have involved the user entity providing the identity element. The identity element may be information used to authenticate the identity of the user entity. Examples of the identity element can include a name of the user entity, a phone number, an email address, a location, a device identifier, or an interaction token for the user entity.

The historical data 125 may list the set of interactions that used the identity element. The historical data 125 may also indicate whether each interaction in the set was identified as being associated with a fraud event, as well as the type of fraud event. Examples of the fraud event may include a chargeback, a decline by rule, a decline by agent, a refund, a decline by authorization, and the like. A chargeback may involve an interaction successfully being performed but subsequently disputed (e.g., due to involving fraudulent or malicious activity). Therefore, a resource transferred by the user entity (e.g., to a target entity) may be returned to the user entity because of the dispute. A decline by rule may involve the interaction being declined due to a predefined rule set by the target entity. For example, the target entity may have a predefined rule stating that any interaction with a particular identity element (e.g., an email address) must be declined. A decline by agent may involve the interaction being declined following review by a human agent (e.g., a fraud expert). A refund may involve an interaction successfully being performed, but subsequently being disputed (e.g., by the user entity). Thus, resources transferred by the user entity to the target entity as part of the interaction can be returned, and in some examples, resources transferred from the target entity to the user entity as part of the interaction can also be returned. A decline by authorization may involve the interaction being declined because it was not authorized by the target entity or, in some examples, a third-party entity associated with the user entity (e.g., a financial service provider associated with the user entity). This may be due to insufficient resources (e.g., account funds), a failed two-factor authentication, a billing address mismatch, or other reasons that may or may not be associated with fraudulent activity.

At block 204, the process 200 involves generating a binomial distribution of the historical data associated with the identity element. For example, the interactions listed in the historical data 125 can be modeled as binary successes or failures with respect to fraud events. A limitation may arise when a frequency of fraud events is considerably lower than total occurrences of fraud events associated with the identity element, which may lead to insufficient resolution for accurate predictions. To overcome this issue, the risk assessment computing system 130 can selectively generate binomial distributions for identity elements having historical data that includes at least one sample of each type of fraud event. To maintain the structure of the historical data, the risk computing system can adjust the total occurrence of fraud events and the occurrence of each type of fraud event by subtracting one from both the number of fraud occurrences and from the total number of interactions, effectively shifting the distribution. In other examples, the risk assessment computing system 130 may generate binomial distributions from historical data including any number of samples for the types of fraud events, including historical data with no detected fraud occurrence. In some examples, the binomial distribution for parameter p, where n is total number of fraud events minus one and k is numbers of types of fraud event minus one, may be or include:

$$f(k, n, p) = Pr(k; n, p) = Pr(X = k) = \binom{n}{k} p^k (1 - p)^{n-k} \quad \text{(Equation 1)}$$

To consider the effect of the fraud event occurrence frequency, the parameter p can be defined as a function of n, as shown in Equations 2a-b:

$$p(n) = \frac{\exp(f(n))}{1 + \exp(f(n))} \quad \text{(Equation 2a)}$$

$$f(n) = \frac{a}{n} + b \quad \text{(Equation 2b)}$$

where a and b are parameters to find for each type of fraud event.

At block 206, the process 200 involves determining, based at least in part on the binomial distribution of the historical data 125, a risk indicator associated with the identity element. For example, the risk assessment computing system 130 can generate the risk indicator using a cumulative distribution function (CDF) of the historical data 125 fitted to the binomial distribution. The risk indicator can indicate a likelihood that the identity element is associated with malicious or fraudulent activity, when used as part of an interaction by the user entity.

In some examples, the risk assessment computing system 130 may generate a binomial distribution and an associated risk indicator for each type of fraud event associated with the identity element from the historical data 125. Then, each of the risk indicators for fraud events can be combined into an overall risk indicator associated with the identity element. Individual fraud event risk indicators can be weighted in the combination function that generates the overall risk indicator. For example, decline by authorization may be a more common fraud event than other types of fraud events, and can result more frequently from non-fraudulent actions. So, a weight for the decline by authorization fraud event risk indicator can be lower than weights for risk indicators generated for other types of fraud events. In some examples, the combination function for the overall risk indicator may be or may include:

$$s_i = CDF(x_i = k) \quad \text{(Equation 3a)}$$

$$\text{Overall risk indicator} = 1 - \prod_{i=1}^{5} (1 - w_i s_i) \quad \text{(Equation 3b)}$$

where $s_i$ is a risk indicator for a type of fraud event, $w_i$ is a weight for a type of fraud event, and i is a type of fraud event.

At block 208, the process 200 involves controlling, based at least in part on the risk indicator associated with the identity element, an interaction involving a target entity and the user entity using the identity element in the interaction. The interaction can be controlled based on a risk indicator determined for a type of fraud event, based on the overall risk indicator associated with the identity element as a whole, or a combination thereof. For example, the risk indicator for refunds using the identity element may be higher than a predefined threshold. This may indicate fraudulent activity by the user entity (e.g., by abusing a refund policy for target entities). Therefore, a subsequent interaction initiated by the user entity and using the identity element may have certain rules applied. In this example, an interaction in which the user entity transmits funds to a target entity to acquire a product may be approved, but a rule may be applied to the user entity that requires the user entity to return the product before a refund for the product can be transmitted to the user. In another example, the overall risk indicator for the user entity may exceed a predefined threshold indicating that the identity element is highly associated with fraudulent activity, and therefore all interactions associated with the identity element should be automatically declined. Interactions using the identity element or any other type of access to the interactive computing environment 107 may be controlled in any other way based on the risk indicator, such as by preventing access to the interactive computing environment 107 based on the overall risk indicator.

Techniques for Updating a Risk Assessment Associated with an Identity Element Using Machine Learning FIG. 3 is a flow chart depicting an example of a process for generating a risk assessment associated with an identity element using machine learning according to some aspects of the present disclosure. In some examples, the operations of the process 300, or any subset thereof, may be performed by the risk assessment computing system 130 via the identity risk assessment server 118 or the interaction risk assessment server 110, but other suitable systems, devices, or subsets or combinations thereof may perform one or more operations described with respect to the process 300. For illustrative purposes, the process 300 is described with reference to certain examples depicted in the figures. Other implementations, however, are possible.

At block 302, the process 300 involves providing interaction data associated with an interaction as input to a trained machine-learning model 115. The machine-learning model 115 may be a random forest model or any suitable type of machine-learning model that is trained to generate an interaction risk indicator for an interaction based on the interaction data as input. The interaction risk indicator may be a likelihood (e.g., a prediction) that the interaction is associated with fraudulent or malicious activity. The machine-learning model 115 may have supervised training, unsupervised training, or any suitable combination. Although such a machine-learning model 115 may not be used to analyze risk associated with individual identity elements across multiple interactions, in some examples the interaction risk indicator may be used to update a risk indicator associated with an identity element to increase accuracy of the risk indicator.

At block 304, the process 300 involves receiving an output indicating an interaction risk indicator from the trained machine-learning model 115. In some examples, the risk assessment computing system 130 may execute the machine-learning model 115 to generate an interaction risk indicator for each interaction listed in the historical data 125 associated with the identity element. Each resulting interaction risk indicator can be combined into a mean interaction risk indicator.

At block 306, the process 300 involves determining an amount of the historical data 125 received from a particular set of target entities. The historical data 125 may include data received from various target entities. Some target entities may have a consistent record of sharing detailed fraud event information, such as chargebacks, refunds, declines, and the like. Other target entities may send little or no fraud event information. Thus, not all historical data 125 may be equally useful in generating an accurate risk indicator associated with the identity element. The risk indicator associated with the identity element can therefore be updated using the interaction risk indicator generated by the machine-learning model 115, which represents risk for interactions (as opposed to risk for identity elements in interactions). The degree to which the risk indicator associated with the identity element is updated based on the interaction risk indicator can depend on the amount of historical data 125 that is received from the particular set of target entities (e.g., an approved list of target entities that consistently send detailed fraud event information).

At block 308, the process 300 involves determining a weight for weighting the interaction risk indicator based on the amount. For example, if the amount of historical data 125 received from the particular set of target entities (e.g., the approved entities) is below a target threshold, this may indicate that it may be beneficial to update the risk indicator associated with the identity element with the interaction risk indicator. The interaction risk indicator can be weighted according to the amount, such that historical data 125 with relatively little data received from approved entities causes the interaction risk indicator to have a higher weight (e.g., more impact in updating the risk indicator associated with the identity element).

At block 310, the process 300 involves updating the risk indicator based at least in part on the interaction risk indicator and the weight. For example, the risk indicator can be combined with the weighted interaction risk indicator. In some examples, the risk indicator can be updated with the mean interaction risk indicator (e.g., of all interactions listed in the historical data 125).

Data Flow for Generating a Risk Assessment Associated with an Identity Element

Figure 4:
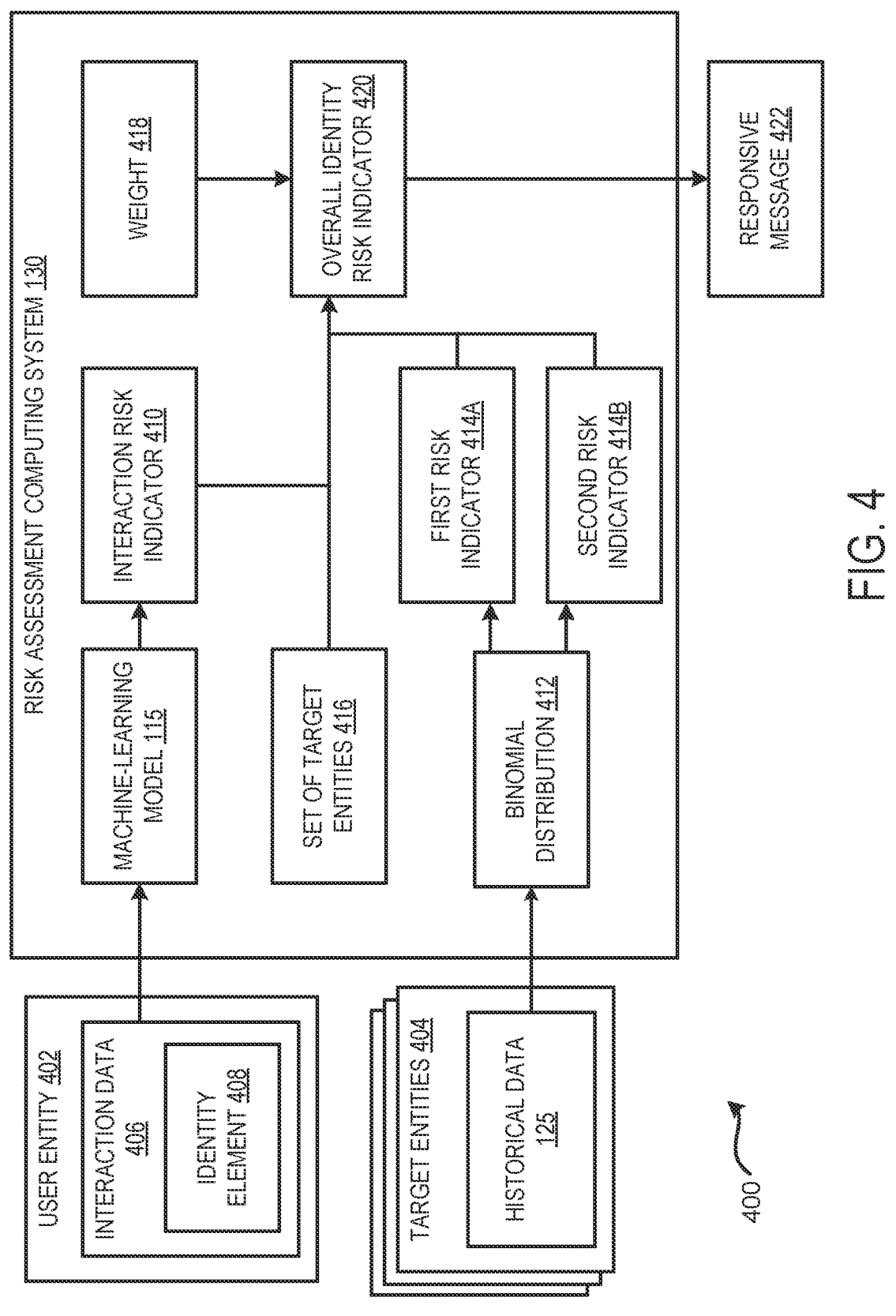
FIG. 4 is a block diagram illustrating a data flow for generating a risk assessment associated with an identity element according to some aspects of the present disclosure.

FIG. 4 is a block diagram illustrating a data flow 400 for generating a risk assessment associated with an identity element according to some aspects of the present disclosure. As illustrated, the data flow 400 can include a user entity 402, target entities 404, the risk assessment computing system 130, and a responsive message 422, though the data flow 400 can include other or additional components. The interaction data 406 can be received by the risk assessment computing system from a user entity 402. The historical data 125 can be received by the risk assessment computing system 130 from one or more target entities 404. In some examples, the interaction data 406, the historical data 125, or a combination thereof may be or include online (e.g., real-time) data, offline (e.g., historical) data, or a combination thereof.

The interaction data 406 may include an identity element 408. The identity element 408 may include identity information about the user entity 402, such as a name, a physical address, a digital address, a phone number, an email address, a location, a device identifier, an interaction token, or any other suitable personally identifiable information for the user entity 402. The interaction data 406 may be stored in a data repository, such as the identity element and interaction data repository 123, and the risk assessment computing system 130 can access the data repository to receive the interaction data 406. In other examples, the interaction data 406 may be streamed, such as in approximately real-time, to the risk assessment computing system 130 based on streamed interactions.

The interaction data 406 may include real-time interaction data or historical interaction data for one or more interactions that use the identity element 408. The interaction data 406 may include a time or day of a particular interaction, a type or amount of resources associated with the particular interaction, separate entities with which the user entity 402 interacts with for the particular interaction (e.g., the target entities 404), and the like.

The historical data 125 can include data indicating fraud events identified for interactions using the identity element (e.g., for a single identity element). That is, the historical data 125 may include a number of times that the identity element has been used in interactions and a number of times that different fraud events have been detected for interactions using the identity element. In some examples, the number of times that different fraud events have been detected can be at least one. That is, the historical data 125 may be restricted to interactions in which at least one fraud event was associated with the identity element. The historical data 125 may be stored in a data repository, such as the identity element and interaction data repository 123, and the risk assessment computing system 130 can access the data repository to receive the historical data 125. In other examples, the historical data 125 may be streamed, such as in approximately real-time, to the risk assessment computing system 130 based on streamed interactions.

The interaction data 406, the historical data 125, or a combination thereof can be transmitted to or otherwise suitably received by the risk assessment computing system 130. In a particular example, the interaction data 406 can be streamed to the machine-learning model 115. The machine-learning model 115 can include one or more machine-learning models, such as a random forest model or the like. The machine-learning model 115 can be configured to generate an output indicating an interaction risk indicator 410 for an interaction using the identity element 408 based on the interaction data 406 as input. The interaction risk indicator 410 may indicate a likelihood of the interaction being associated with a manipulated identity or fraudulent activity. In some examples, the machine-learning model 115 can generate an interaction risk indicator 410 for each interaction listed in the historical data 125 associated with the identity element. The interaction risk indicator 410 for each interaction can be combined into a mean interaction risk indicator.

The risk assessment computing system 130 can receive the historical data 125 and can generate a binomial distribution associated with the identity element. Because, in some examples, the historical data 125 may be restricted to interactions in which at least one fraud event was detected, the total number of fraud events and the total number of interactions can be reduced by one to generate the binomial distribution. In some examples, the risk assessment computing system 130 can generate a binomial distribution associated with the identity element for each type of fraud event indicated in the historical data 125. For example, the risk assessment computing system 130 may generate a first binomial distribution for a first type of fraud event from the historical data 125, and a second binomial distribution for a second type of fraud event from the historical data 125. The risk assessment computing system 130 can generate a first risk indicator 414a for the first type of event from the first binomial distribution and a second risk indicator 414b for the second type of event from the second binomial distribution. The risk indicators 414a-b may indicate a likelihood of the identity element being associated with an interaction having or being involved with a manipulated identity or fraudulent activity.

Each type of fraud event may be associated with a predefined weight 418 representing an importance of the type of fraud event in determining an overall identity risk indicator 420. For example, the first type of fraud event may be a commonly occurring fraud event that may be overreported (e.g., reported as a fraud event but not actually associated with fraudulent or malicious activity). Thus, the first type of fraud event may have a weight 418 that is lower than a weight for the second type of fraud event. The risk assessment computing system 130 can combine the first risk indicator 414a and the second risk indicator 414b into an overall identity risk indicator 420 associated with the identity element 408. For example, the risk assessment computing system 130 can weigh the first risk indicator 414a with a first weight for the first type of fraud event and weight the second risk indicator 414b with a second weight for the second type of fraud event to generate the overall identity risk indicator 420.

In some examples, the risk assessment computing system 130 may determine or update the overall identity risk indicator 420 using the interaction risk indicator 410 produced by the machine-learning model 115. The interaction risk indicator 410 may be useful when some or all of the historical data 125 is provided by target entities 404 that may not have robust fraud detection or reporting systems. The risk assessment computing system 130 may determine an amount of the historical data 125 that was received from a particular set of target entities 416. The set of target entities 416 may be a list of "approved" entities that typically provide high quality historical data 125. The risk assessment computing system 130 may weight the impact of the interaction risk indicator 410 (e.g., the mean interaction risk indicator) in updating the overall identity risk indicator 420 based on the amount of historical data 125 received from the set of target entities 416.

The overall identity risk indicator 420 can use the overall identity risk indicator 420 to generate a responsive message 422, which may be used to control access of the user entity 402 using the identity element 408 in accessing an interactive computing environment, to control a real-world or digital interaction involving the user entity 402 using the identity element 408 to interact with a target entity 404, and the like. In some examples, the responsive message 422 may cause the interactive computing environment, the target entity 404, or the like to approve, deny, flag for review, or perform any other action with respect to an interaction using the identity element 408.

Example of Computing System

Figure 5:
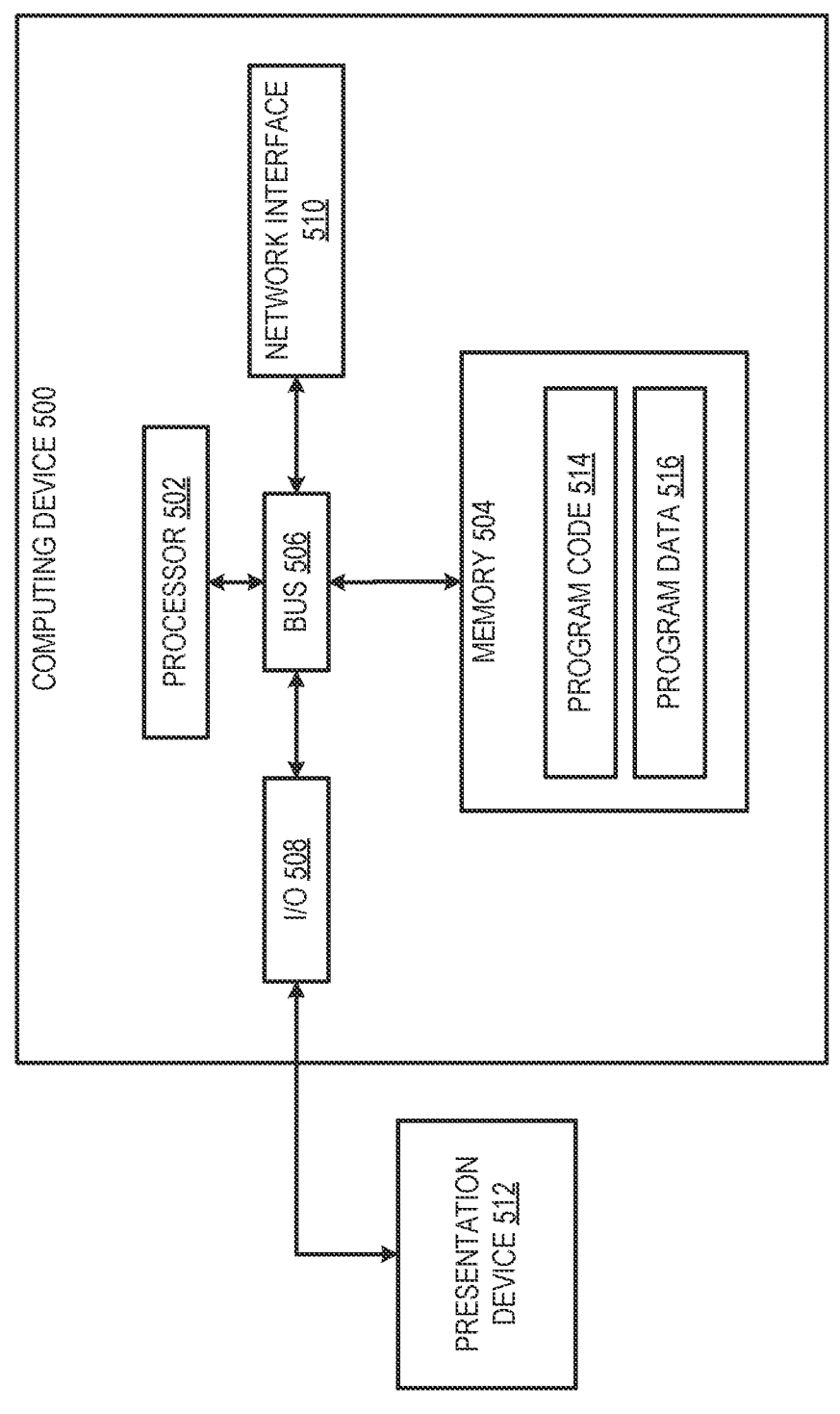
FIG. 5 is a block diagram depicting an example of a computing device, which can be used to implement the embodiments described herein according to some aspects of the present disclosure.

Any suitable computing system or group of computing systems can be used to perform the operations for the techniques described herein. For example, FIG. 5 is a block diagram depicting an example of a computing device 500, which can be used to implement the identity risk assessment server 118 and the interaction risk assessment server 110. The computing device 500 can include various devices for communicating with other devices in the computing environment 100, as described with respect to FIG. 1. The computing device 500 can include various devices for performing one or more operations, such as risk assessment operations, described above with respect to FIGS. 1-4.

The computing device 500 can include a processor 502 that can be communicatively coupled to a memory 504. The processor 502 can execute computer-executable program code stored in the memory 504, can access information stored in the memory 504, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc., may be passed, forwarded, or transmitted via any suitable means including memory sharing, message passing, token passing, network transmission, among others.

Examples of a processor 502 can include a microprocessor, an application-specific integrated circuit (ASIC), a field-programmable gate array (FPGA), or any other suitable processing device. The processor 502 can include any suitable number of processing devices, including one. The processor 502 can include or communicate with a memory 504. The memory 504 can store program code that, when executed by the processor 502, causes the processor 502 to perform the operations described herein.

The memory 504 can include any suitable non-transitory computer-readable medium. The computer-readable medium can include any electronic, optical, magnetic, or other storage device capable of providing a processor with computer-readable program code or other program code. Non-limiting examples of a computer-readable medium can include a magnetic disk, memory chip, optical storage, flash memory, storage class memory, ROM, RAM, an ASIC, magnetic storage, or any other medium from which a computer processor can read and execute program code. The program code may include processor-specific program code generated by a compiler or an interpreter from code written in any suitable computer-programming language. Examples of suitable programming language can include Hadoop, C, C++, C#, Visual Basic, Java, Python, Perl, JavaScript, ActionScript, etc.

The computing device 500 may also include a number of external or internal devices such as input or output devices. For example, the computing device 500 is illustrated with an input/output interface 508 that can receive input from input devices or provide output to output devices. A bus 506 can also be included in the computing device 500. The bus 506 can communicatively couple one or more components of the computing device 500.

The computing device 500 can execute program code 514 that can include identity risk assessment application 114 and the interaction risk assessment application 112. The program code 514 for the identity risk assessment application 114 and the interaction risk assessment application 112 may be resident in any suitable computer-readable medium and may be executed on any suitable processing device. For example, and as illustrated in FIG. 5, the program code 514 for the identity risk assessment application 114 and the interaction risk assessment application 112 can reside in the memory 504 at the computing device 500 along with the program data 516 associated with the program code 514, such as the historical data 125. Executing the identity risk assessment application 114 and the interaction risk assessment application 112 can configure the processor 502 to perform at least a portion of the operations described herein.

In some aspects, the computing device 500 can include one or more output devices. One example of an output device can be or include the network interface device 510 illustrated in FIG. 5. A network interface device 510 can include any device or group of devices suitable for establishing a wired or wireless data connection to one or more data networks described herein. Non-limiting examples of the network interface device 510 can include an Ethernet network adapter, a modem, etc.

Another example of an output device can include the presentation device 512 depicted in FIG. 5. A presentation device 512 can include any device or group of devices suitable for providing visual, auditory, or other suitable sensory output. Non-limiting examples of the presentation device 512 can include a touchscreen, a monitor, a speaker, a separate mobile computing device, etc. In some aspects, the presentation device 512 can include a remote client-computing device that communicates with the computing device 500 using one or more data networks described herein. In other aspects, the presentation device 512 can be omitted.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

What is claimed is:

1. A system comprising:
a processor; and
a non-transitory computer-readable medium comprising instructions that are executable by the processor for causing the processor to perform operations comprising:
    receiving historical data comprising a presence or an absence of detected fraud events for an identity element associated with a user entity, the identity element used in a set of interactions associated with the user entity;
    generating a binomial distribution of the presence or the absence of the detected fraud events for the identity element in the set of interactions;
    determining, based at least in part on the binomial distribution, a risk indicator associated with the identity element;
    determining, based at least in part on the risk indicator, a rule controlling subsequent interactions that use the identity element; and
    subsequent to determining the risk indicator associated with the identity element, controlling, based at least in part on the rule, an interaction involving a target entity and the user entity that is using the identity element.

2. The system of claim 1, wherein the operations further comprise controlling the interaction involving the target entity and the user entity by:
    preventing the interaction from being performed based at least in part on the risk indicator associated with the identity element.

3. The system of claim 1, wherein the operations further comprise:
    preventing access of a computing environment for the target entity by the user entity based at least in part on the risk indicator associated with the identity element.

4. The system of claim 1, wherein the identity element comprises identity information about the user entity, wherein the historical data comprises a number of times the identity element has been used by the user entity in an interaction associated with a fraud event, and wherein the number of times is at least one time.

5. The system of claim 1, wherein the risk indicator is a first risk indicator associated with a first type of fraud event, and wherein the operations further comprise:
    determining, based at least in part on the binomial distribution, a second risk indicator associated with the identity element associated with a second type of fraud event;
    determining a first predefined weight associated with the first type of fraud event and a second predefined weight associated with the second type of fraud event; and
    generating an overall risk indicator associated with the identity element based at least in part on weighting the first risk indicator with the first predefined weight and the second risk indicator with the second predefined weight.

6. The system of claim 1, wherein the operations further comprise:
    providing interaction data associated with the interaction as input to a trained machine-learning model, wherein the trained machine-learning model is configured to generate, based at least in part on the input, an output comprising an interaction risk indicator associated with the interaction;
    receiving output comprising the interaction risk indicator from the trained machine-learning model; and
    updating the risk indicator associated with the identity element based at least in part on the interaction risk indicator.

7. The system of claim 6, wherein the historical data comprises data received from a plurality of target entities, and wherein the operations further comprise updating the risk indicator associated with the identity element based at least in part on the interaction risk indicator by:
    determining an amount of the historical data that was received from a particular set of target entities of the plurality of target entities; and
    determining a weight associated with the interaction risk indicator used in updating the risk indicator associated with the identity element based at least in part on the amount of the historical data that was received from the particular set of target entities.

8. A method comprising:
receiving, by a processor, historical data comprising a presence or an absence of detected fraud events for an identity element associated with a user entity, the identity element used in a set of interactions associated with the user entity;
generating, by the processor, a binomial distribution of the presence or the absence of the detected fraud events for the identity elements in the set of interactions;
determining, by the processor and based at least in part on the binomial distribution, a risk indicator associated with the identity element;
determining, by the processor and based at least in part on the risk indicator, a rule controlling subsequent interactions that use the identity element; and
subsequent to determining the risk indicator associated with the identity element, controlling, by the processor and based at least in part on the rule, an interaction involving a target entity and the user entity that is using the identity element.

9. The method of claim 8, wherein controlling the interaction involving the target entity and the user entity further comprises:
    preventing the interaction from being performed based at least in part on the risk indicator associated with the identity element.

10. The method of claim 8, further comprising:
    preventing access of a computing environment for the target entity by the user entity based at least in part on the risk indicator associated with the identity element.

11. The method of claim 8, wherein the identity element comprises identity information about the user entity, wherein the historical data comprises a number of times the identity element has been used by the user entity in an interaction associated with a fraud event, and wherein the number of times is at least one time.

12. The method of claim 8, wherein the risk indicator is a first risk indicator for a first type of fraud event, and wherein the method further comprises:

determining, based at least in part on the binomial distribution, a second risk indicator associated with the identity element associated with a second type of fraud event;

determining a first predefined weight associated with the first type of fraud event and a second predefined weight associated with the second type of fraud event; and generating an overall risk indicator associated with the identity element based at least in part on weighting the first risk indicator with the first predefined weight and the second risk indicator with the second predefined weight.

13. The method of claim 8, further comprising:

providing interaction data associated with the interaction as input to a trained machine-learning model, wherein the trained machine-learning model is configured to generate, based at least in part on the input, an output comprising an interaction risk indicator for the interaction;

receiving output comprising the interaction risk indicator from the trained machine-learning model; and updating the risk indicator associated with the identity element based at least in part on the interaction risk indicator.

14. The method of claim 13, wherein the historical data comprises data received from a plurality of target entities, and wherein updating the risk indicator associated with the identity element based at least in part on the interaction risk indicator further comprises:

determining an amount of the historical data that was received from a particular set of target entities of the plurality of target entities; and determining a weight for the interaction risk indicator used in updating the risk indicator associated with the identity element based at least in part on the amount of the historical data that was received from the particular set of target entities.

15. A non-transitory computer-readable medium comprising instructions that are executable by a processor for causing the processor to perform operations comprising:

receiving historical data comprising a presence or an absence of detected fraud events for an identity element associated with a user entity, the identity element used in a set of interactions associated with the user entity;

generating a binomial distribution of the presence or the absence of the detected fraud events for the identity element in the set of interactions;

determining, based at least in part on the binomial distribution, a risk indicator associated with the identity element;

determining, based at least in part on the risk indicator, a rule controlling subsequent interactions that use the identity element; and subsequent to determining the risk indicator associated with the identity element, controlling, based at least in part on the rule, an interaction involving a target entity and the user entity that is using the identity element.

16. The non-transitory computer-readable medium of claim 15, wherein the operations further comprise controlling the interaction involving the target entity and the user entity by:

preventing the interaction from being performed based at least in part on the risk indicator associated with the identity element.

17. The non-transitory computer-readable medium of claim 15, wherein the operations further comprise:

preventing access of a computing environment for the target entity by the user entity based at least in part on the risk indicator associated with the identity element.

18. The non-transitory computer-readable medium of claim 15, wherein the identity element comprises identity information about the user entity, wherein the historical data comprises a number of times the identity element has been used by the user entity in an interaction associated with a fraud event, and wherein the number of times is at least one time.

19. The non-transitory computer-readable medium of claim 15, wherein the risk indicator is a first risk indicator for a first type of fraud event, and wherein the operations further comprise:

determining, based at least in part on the binomial distribution, a second risk indicator associated with the identity element associated with a second type of fraud event;

determining a first predefined weight associated with the first type of fraud event and a second predefined weight associated with the second type of fraud event; and generating an overall risk indicator associated with the identity element based at least in part on weighting the first risk indicator with the first predefined weight and the second risk indicator with the second predefined weight.

20. The non-transitory computer-readable medium of claim 15, wherein the operations further comprise:

providing interaction data associated with the interaction as input to a trained machine-learning model, wherein the trained machine-learning model is configured to generate, based at least in part on the input, an output comprising an interaction risk indicator for the interaction;

receiving output comprising the interaction risk indicator from the trained machine-learning model; and updating the risk indicator associated with the identity element based at least in part on the interaction risk indicator.

* * * * *